Feb. 5, 1935.  E. KAMRASS  1,990,407
METAL STEMMING STICK
Filed May 1, 1934
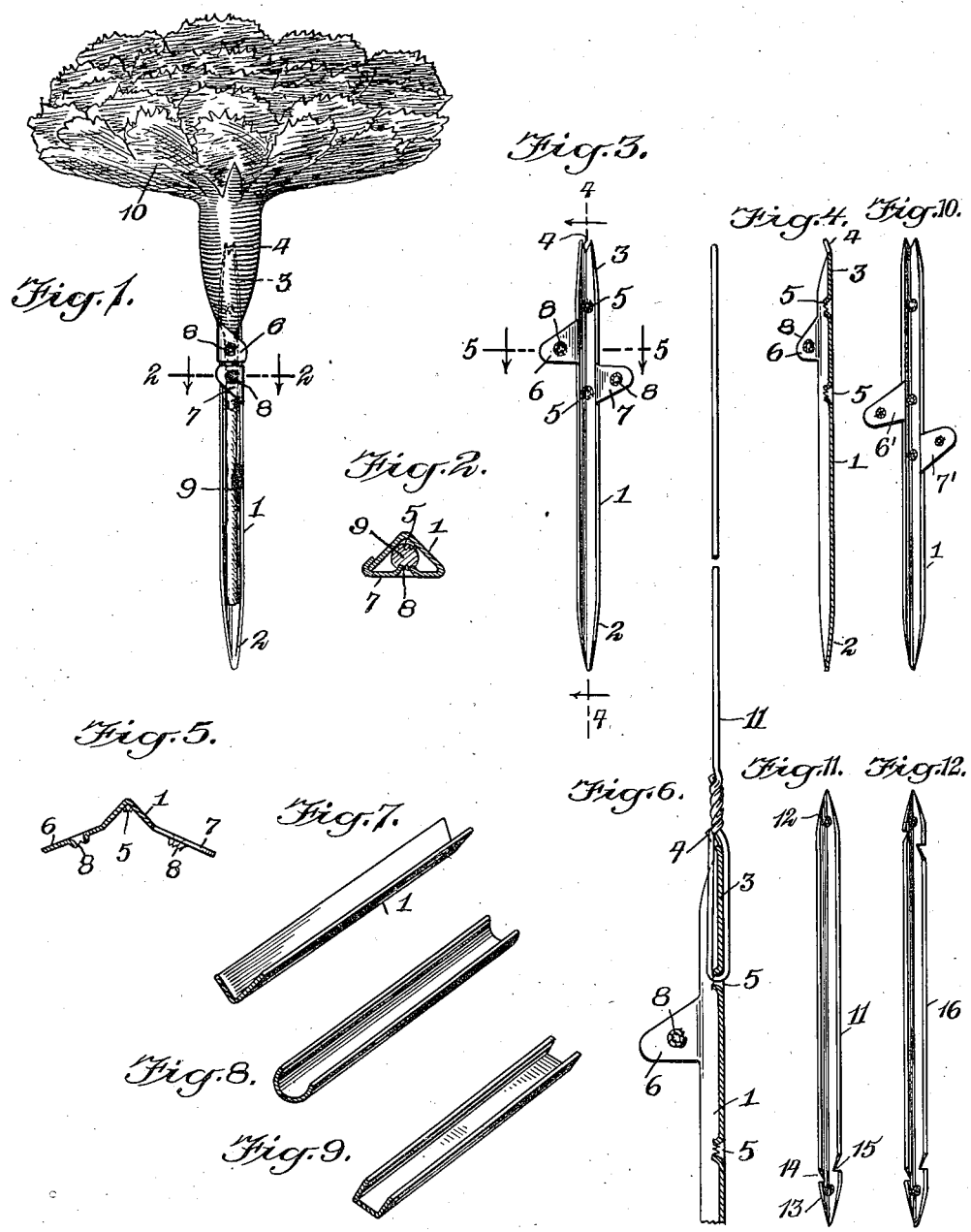
INVENTOR
Ellis Kamrass
BY
Munn, Anderson & Liddy
ATTORNEYS
WITNESSES Patented Feb. 5, 1935

1,990,407

UNITED STATES PATENT OFFICE 1,990,407

METAL STEMMING STICK

Ellis Kamrass, New York, N. Y.

Application May 1, 1934, Serial No. 723,387

4 Claims. (Cl. 47—55)

This invention relates to an improved metal stemming stick, the object being to provide a construction which may be readily connected to a flower, leaves, or bunches of flowers and leaves, to provide a stick capable of being inserted into a wreath or other place to hold the flower or other material in proper position.

Another object of the present invention is to provide a stemming stick which presents a grooved formation which secures the stem of a flower or other article, and which is also provided with a tapering extension fitting into the base of the flower, with means for wrapping around the stem so as to press the stem and really act as part of the extension.

A further object of the invention is to provide a metal stemming stick wherein a suitable body is provided having bendable ears with spurs projecting therefrom, and also with spurs projecting from the body so that when the stick is in functioning position the spurs will interlock with the stem of the flower or other article.

A still further object is to provide a metal stemming stick wherein not only are there provided encircling ears and a bracing extension at the upper end, but a wire at the upper end which may be wrapped around the metal stem and also any additional stem structures connected therewith to produce an extra long stem for the flower or other article.

In the accompanying drawing—

Figure 1 is a side view of a flower with a metal stemming stick applied thereto;

Figure 2 is a sectional view through Figure 1 on the line 2—2, the same being on an enlarged scale;

Figure 3 is a front view of the stemming stick shown in Figure 1;

Figure 4 is a sectional view through Figure 3 on the line 4—4;

Figure 5 is a transverse sectional view through Figure 3 on the line 5—5, the same being on an enlarged scale;

Figure 6 is a view similar to the upper part of Figure 4 but showing a wire connected therewith;

Figure 7 is a perspective view showing part of the stemming stick with the body having flanges arranged at right angles to each other;

Figure 8 is a view similar to Fig. 7 but showing a rounded trough shaped body structure;

Figure 9 is a perspective view similar to Figs. 7 and 8 but showing a channel shaped body structure;

Figure 10 is a view similar to Fig. 3 but showing ears or wings near the center of the stick;

Figure 11 is a view similar to Fig. 3 but with the ears eliminated and notches forming a spearhead at one end and a point at the opposite end;

Figure 12 is a view similar to Figure 8 but showing a notched or headed structure at each end.

In forming wreaths and other floral pieces it has been customary in the past to reinforce the stems of the flowers in order to support them in proper position on the wreath or other piece. It has also been customary, heretofore, to use wire and other means for lengthening the stem of the flower or spray of leaves or other material. However, much care must be taken in the preparation of these additions. Also, considerable expense is involved, many times, in adding these attachments to flowers and the like so that they will always remain in the position intended.

In the present invention an improved metal stemming stick has been provided which overcomes many of the disadvantages heretofore presented, including the fact that the stick may be made very cheaply and when in operation will efficiently support the flower in the desired position.

As shown in Figures 1 to 4, inclusive, there is provided a stemming stick having a body 1 which in cross section presents a right angled structure, as illustrated in Figures 2, 5 and 7. At the lower end there is an appreciably pointed portion 2, and at the upper end a similarly pointed portion 3 which, if desired, may be the same length or longer than the lower portion 2. Also, preferably, the bracing upper portion 3 is provided with a notch 4 and a pressed-out portion 5 presenting inwardly extending spurs. Also near the top of the lower portion 3 there are arranged ears 6 and 7 having comparatively wide bases tapering to narrow, outer, rounded ends. The lower end of the ear 6 extends at right angles to the body 1, while the upper edge of ear 7 extends at right angles thereto. The opposite edges of both ears extend at an angle so that the base of the respective ears will be comparatively wide. These ears are integral extensions of the body 1 and are of a size to be readily bendable around the stem of a flower, as shown in Figure 1, or around any other article. A pressed out spur structure 8 is provided on each ear and these spurs are adapted to be pressed into the stem 9 of the flower 10, as clearly shown in Figure 2. Also, the spur structures 5 extend into the stem and thereby hold the parts firmly in place, while the portion 3 overlaps the torus or calyx of the flower to produce a desired bracing action. It is, of course, evident that the body 1 could be made of any desired length so as to extend an appreciable distance beyond the stem, or could be made comparatively short to merely stiffen the stem so that it may be readily inserted into the wreath or other receiving article.

Under some circumstances it may be desired to lay an extra stem in the grooved formation of the body 1 to produce an extra long stem for the flower. When this is the case a wire 11, which may be a small copper wire, is inserted through one of the pressed out portions 5 and twisted into place with part extending through the notch 4. The wire may then be wrapped around the body 1 in a spiral manner to the end and on down around the extending stem which is being added. In this way any desired length of stem may be provided to make the flower sit up or be positioned in the necessary place.

Also, in forming the stemming stick it may be made not only of the shape shown in Figures 1 to 7 inclusive, but may be made trough shaped or rounded as shown in Figure 8, or channel shaped as shown in Figure 9. In all forms of the invention the metal is comparatively thin but sufficiently stiff to properly stand up and support a flower. Thinness is desirable in order to keep the weight of the device down to a minimum and to permit the ears 6 and 7 to readily bend or wind around the stem. The tapering portion 2 at the lower end of the body is more or less pointed so that it may be easily pressed down through the wreath or other article where the flower is to be secured. The body 1 has a smooth edge so that it will not injure the fingers of the operator, and though only two ears 6 and 7 have been shown, any desired number of ears may be used and also any desired number of spurs may be provided for on the ears or the body. In arranging the ears on the body these are spaced so that they will not touch when in functioning position, as shown in Fig. 1. The upper extension or bracing portion 3 acts to support the stem and torus or calyx of the flower and prevents the breaking off of the head of the flower when pressure is used in bending the ears 6 and 7.

In Figs. 10, 11 and 12 will be seen slightly modified constructions which are closely allied to that shown in Fig. 1 but which accomplish certain additional results. For instance, in Fig. 10 the respective ears 6' and 7' are arranged near the center of the stick so as to reinforce the stem at a distance spaced downwardly from the calyx. It will be understood that in most cases the upper end of the stick is forced into the calyx as this is the strongest part of the flower. Under some circumstances the ears 6' and 7' are eliminated, as shown in Figs. 11 and 12.

As illustrated in Fig. 11 the stick 11 is provided with a smooth point 12 at one end and with a spear point 13 at the other end, said spear point being formed by a smooth point similar to point 12, and with notches 14 and 15. The point 13 is adapted to be inserted into the calyx and by reason of the notches 14 and 15 will become locked therein. While the point 12 permits the device to be easily inserted into a wreath or other supporting object, the stem 16 is provided with a spear point structure at each end similar to the spear point 13, so that either end may be forced into the calyx of a flower.

It will be evident that slightly modified forms might be used without departing from the spirit of the invention, provided the function of the parts remain the same and the same principle is used for stiffening the stem and reinforcing and bracing the juncture of the stem and calyx of the flower.

I claim:

1. A metal stemming stick for flowers, comprising a body which is substantially trough shaped, said body being notched at the upper end and provided near the upper end with an inwardly extending spur and near the spur with oppositely extending ears, each ear being formed with a spur and also being bendable.

2. A metal stemming stick comprising a body provided with a plurality of integrally extending bendable ears, an aperture, and a wire extending through said aperture and twisted, said wire being adapted to be wound around the body of the flower to hold the stem in place.

3. A metal stemming stick comprising a body formed substantially trough shaped and provided with a pair of bendable ears spaced from the upper end, said body near the upper end being provided with an aperture, and at the upper end with a notch, a wire extending through said aperture and twisted to snugly fit into said notch, said wire being wound around said body and extending therebelow to hold the stem of the flower in the body.

4. A metal stemming stick comprising a body formed substantially trough shaped and having a pointed end and a spur near the pointed end, said pointed end being adapted to be forced into the calyx of a flower when used to support the flower, the stem of the flower fitting into the trough of the body.

ELLIS KAMRASS.